Patented June 29, 1943

2,323,276

UNITED STATES PATENT OFFICE 2,323,276

SATURATED AND UNSATURATED PREGNANE COMPOUNDS AND PROCESS OF MAKING SAME

Karl Miescher, Riehen, and Albert Wettstein, Basel, Switzerland, assignors to Ciba Pharmaceutical Products, Incorporated, Summit, N. J.

No Drawing. Application January 22, 1941, Serial No. 375,528. In Switzerland January 17, 1940

10 Claims. (Cl. 260—397.5)

It has been found that saturated and unsaturated pregnane polycarbonyl compounds or their substitution products with, for example, additional oxo or free or substituted hydroxyl groups may be obtained by treating pregnane-20-ones, containing in the rings A or B merely free or substituted tertiary hydroxyl groups, with reducing agents and hereupon with agents eliminating water, acid or alcohol, causing the unsaturated products to react with oxidizing agents and, finally, if desired, treating with hydrolyzing, acylating agents and/or oxidizing, dehydrogenating, water or acid eliminating agents. During this process, if desired, the 20-carbinols may be converted into their esters or ethers by the action of esterifying or etherifying agents either before, during or after the elimination of the tertiary hydroxyl groups in the rings A or B.

The parent materials mentioned are obtained, among other methods, for example by the degradation of the side chains of corresponding dimethyl - cyclopentano - polyhydrophenanthrene compounds containing such side chains according to the instructions contained in Patent No. 2,319,012. They contain, particularly in the 5-position or, for example, in the 8-position, a tertiary hydroxyl group, which may be esterified by inorganic or organic acids or etherified by alcohols or phenols.

By reducing agents are to be understood all such agents as are suitable for the conversion of the 20-keto group into a carbinol group. The 20-carbinols thus obtained, if desired, are, at this stage or only during or after the elimination of the tertiary hydroxyl group, converted into their esters or ethers by the action of esterifying or etherifying agents in a manner of itself known. Here particularly esterifying agents may be used which are capable of introducing aliphatic acid radicals, such as those of formic, acetic, propionic, n- or iso-butyric, n- or iso-valeric, caproic, caproic, palmitic, or stearic acids, or of aromatic, fatty aromatic or inorganic acid radicals, such as the radicals of benzoic, cinnamic or substituted carbonic acids. For the purposes of etherification, radicals of aliphatic or aliphatic-aromatic alcohols or phenols are introduced, for example, methyl, ethyl, benzyl, triarylmethyl radicals and the like. By the reduction of the 20-keto group to the carbinol group, and the possible subsequent esterification or etherification, the oxidation of the 21-methyl group standing in the α-position to the 20-keto group is prevented during the later action of an oxidizing agent.

The products are now treated in a manner of itself known with agents capable of eliminating water, acid or alcohol, 4,5- or 5,6-unsaturated compounds, for example, being thus obtained.

Oxidizing agents are now caused to react upon the unsaturated reaction products obtained, and in particular those capable of introducing oxygen or groups containing oxygen in the α-position to the double bond in a manner of itself known. These are, for example, selenium dioxide, lead tetracylates, chromic acid, and so on, which lead to compounds containing oxo, hydroxy or substituted hydroxyl groups in the α-position to the double bond. In place of these, however, oxidizing agents may also be caused to react on the unsaturated products which are capable of adding oxygen or groups containing oxygen directly or indirectly to the double bond itself. For this purpose are suitable, for example, peroxides, such as hydrogen peroxide, if desired, in the presence of alkalis or metal oxides, furthermore peracids, halogens, metal oxides, such as osmium tetroxide or vanadic acid, if desired, in the presence of chlorates, also permanganates, lead tetracylates, aryl-iodosoacylates, or halogen-silver benzoate complexes. In order to convert substituted hydroxyl groups or newly introduced epoxy groupings into free hydroxyl groups, the reaction products are further treated, if desired, with hydrolyzing agents; partially substituted polyhydroxy compounds may be formed, on the other hand, by partial substitution of the free polyalcohols, using the easier reactivity, for example, of a hydroxyl group in the 3-position towards, for instance, acylating agents.

In this manner, compounds of the pregnane series have now been obtained which contain a keto group or a free hydroxyl group in the 20-position and also, in the rings A or B, keto groups or free or esterified hydroxyl groups in the α-position to double bonds, or else, in the rings A or B, two adjacent free or esterified hydroxyl groups. From the compounds which contain hydroxyl groups in 20-position or in the rings A or B, the desired saturated or unsaturated pregnane polycarbonyl compounds or their substitution products may subsequently be obtained in a manner of itself known by the action of agents eliminating water or acid or by the action of oxidizing or dehydrogenating agents.

The following illustrates some of the above reactions by means of formulae without in any way restricting the scope of the invention.

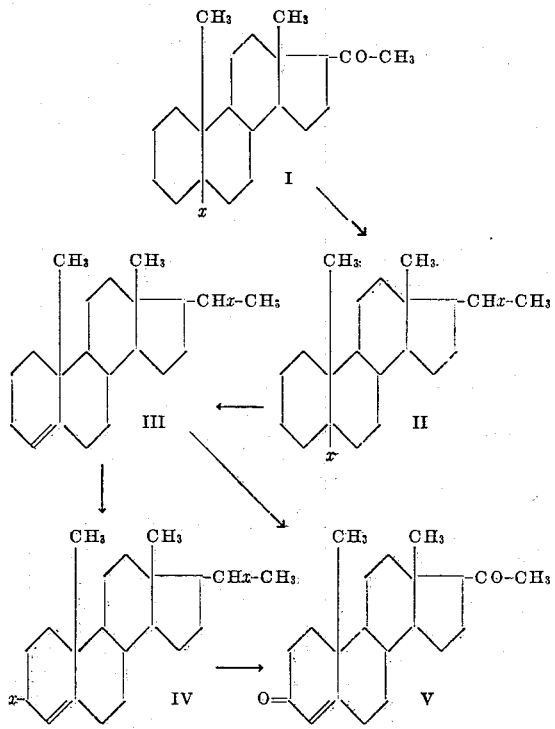

$x$ = free, esterified or etherified hydroxyl group.

*Example 1*

1 part of 5-hydroxy-pregnane-20-one of Formula I ($x$=OH; prepared, for example, according to Patent No. 2,319,012 by splitting the side chain in 5-hydroxy-cholestane) is dissolved in 25 parts of pure alcohol and is hydrogenated by means of a nickel catalyst, prepared, for example, according to the method of Rupe or Raney. The hydrogenation is interrupted when 1 molecule of hydrogen has been absorbed, the catalyst is removed by filtering and the filtrate is evaporated to dryness in vacuo. By recrystallization from isopropyl ether a mixture of epimeric pregnane-5,20-diols of Formula II ($x$=OH) is obtained in the form of colorless crystals.

In place of a catalytic hydrogenation the reduction may be carried out, for example, by means of nascent hydrogen like an alkali metal and an alcohol, by means of an organo-metal compound prone to the formation of unsaturated hydrocarbons, for example, isopropyl-magnesium iodide, or even by biochemical or electrochemical means.

This mixture is heated for 2 hours with 10 parts of boiling propionic acid anhydride, the secondary hydroxyl group being acylated but the tertiary hydroxyl group being split off in the form of water. The reaction mixture is then poured into 50 parts of water and, after the decomposition of the anhydride, the ester which has crystallized out is filtered off at the pump, washed with water and dried in the vacuum exsiccator. By recrystallization from hexane, a mixture of epimeric $\Delta^2$-pregnene-20-ole-propionates of Formula III ($x$=—OCO—C₂H₅), together with some analogous $\Delta^5$-compounds, is obtained in the form of colorless crystals.

Naturally, instead of propionic acid anhydride, other desired acid anhydrides may be used, for example, acetic anhydride, or other desired agents capable of eliminating water may find application, such as alcoholic hydrogen halide solutions.

Instead of eliminating the tertiary hydroxyl group during the acylation of the secondary hydroxyl, the elimination may be carried out before the acylation, for instance, by means of an alcoholic solution of hydrogen halide, or after the acylation has been carried out gently, for example, by means of propionic acid anhydride in pyridine at room temperature.

Instead of 5-hydroxy-pregnane-20-one, a compound having a substituted hydroxyl group, for instance, esterified or etherified hydroxyl group, in the 5-position may be used as parent material. In this case, instead of agents eliminating water, agents or means which eliminate acid or alcohol are used, for example, alkalis, carbonic acid salts or high vacuum distillation, thus obtaining the same end products.

If, in place of the 5-hydroxy-pregnane-20-one, a parent material be used which is hydroxylated in another position, for example, 8-hydroxy-pregnane-20-one, its esters or ethers, the corresponding unsaturated products are obtained.

Thus quite generally as intermediates pregnane derivatives may be obtained containing in the rings A and B, for example in 5- or 8-position, merely free or substituted tertiary hydroxyl groups, which are eliminated later, and in 20-position a free, esterified or etherified hydroxyl group, for example, an acylated hydroxyl group.

1 part of the mixture of epimeric $\Delta^4$-pregnene-20-ole-propionates (Formula III; $x$=—OCO—C₂H₅)

is heated with 2,2 parts of lead tetracetate and 25 parts of glacial acetic acid for some time to 75° C. with exclusion of moisture. The reaction mixture is then filtered, evaporated in vacuo and, after addition of water, is extracted exhaustively with ether. The ethereal solution is washed with soda solution and water, dried and evaporated. The residue is taken up in hexane and is chromatographed with the aid of aluminium oxide. $\Delta^4$-pregnene-3,20-diole-3-acetate-20-propionate of Formula IV ($x$=—OCO—CH₃ and —OCO—C₂H₅) is obtained as the chief product.

By boiling for 2 hours in a methanolic solution of potassium hydroxide of 5 percent strength, this diester may be saponified, a preparation of $\Delta^4$-pregnene-3,20-diols (Formula IV; $x$=OH)

being obtained which sterically is not homogeneous. These compounds, being $\alpha,\beta$-unsaturated alcohols, give a strong reaction with trichloroacetic acid. For their oxidation or dehydrogenation they are treated either, with intermediate protection of the double bond by bromination, with chromic acid in glacial acetic acid or, without intermediate protection of the double bond, with an aluminium alcoholate in the presence of a ketone, such as acetone or cyclohexanone. In this way, the known $\Delta^4$-pregnene-3,20-dione of Formula V (progesterone) is obtained.

*Example 2*

1 part of 5-hydroxy-pregnane-20-one of

Formula I ($x=$OH) is reduced to a mixture of epimeric pregnane-5,20-diols of Formula II ($x=$OH) as described in Example 1. This is next heated with 20 parts of a 5 percent solution of hydrochloric acid in methyl alcohol. 1 part of the preponderantly resulting $\Delta^4$-pregnene-20-ole (Formula III; $x=$OH) is dissolved in 50 parts of glacial acetic acid, a solution of 2.5 parts of chromium trioxide in a little water is added and the whole is stirred for 12 hours at room temperature. 400 parts of water are now added, the reaction solution is extracted exhaustively with ether, the ethereal solution is washed with bicarbonate solution and water, and, after drying, is evaporated in vacuo. From the residue progesterone ($\Delta^4$-pregnene-3,20-dione) of Formula V is obtained directly, in addition to corresponding 6-oxo- and 3,6-dioxo-compounds, by fractional adsorption and subsequent crystallization, or sublimation.

In place of chromic acid, selenium dioxide, for example, or a lead tetracylate may be used for the oxidation. In this case, $\Delta^4$-3-hydroxy- or -acyloxy-compounds are primarily obtained. These may also be converted into progesterone, if necessary after saponification of the ester group, by the action of oxidizing or dehydrogenating agents, in manner of itself known.

*Example 3*

The $\Delta^4$-pregnene-20-ole, obtained in Example 2, is treated in ethereal solution with an ethereal solution of 1.1 equivalents of osmium tetroxide, allowing the reaction mixture to stand 5 days at room temperature. The solution is then evaporated completely, using a bath temperature of 30° C., and the residue is heated in aqueous-alcoholic solution for 2 hours with sodium sulphite. Other reducing agents, such as acid agents like ascorbic acid or formic acid, may also be used for the reductive hydrolysis of the osmic acid ester. The filtered reduction mixture is poured into water, the aqueous liquor is extracted exhaustively with chloroform, and the chloroform solution, after having been purified from the last traces of colloidal osmium by means of an acid adsorption agent, is evaporated. From the residue, a mixture of crude pregnane-4,5,20-triols is obtained.

Instead of the direct addition of two hydroxyl groups to the double bond, an oxide ring or either one or both of the hydroxyl groups in substituted form, for example, in acylated form, may first of all be added, in which case use is made of the known reagents mentioned as examples already before. The oxide rings or substituted hydroxyl groups may subsequently be hydrolyzed, the latter either wholly or partially.

As the last stage of the process, an oxidizing agent is caused to act upon the pregnane-4,5,20-diols, if desired, after the action of an agent which eliminates water. Thus, the product may be sublimed over anhydrous potassium bisulphate in a high vacuum and the sublimate may be oxidized in glacial acetic acid solution by means of chromic acid at room temperature. Recrystallization from hexane yields pregnane-4,20-dione in the form of colorless crystals.

If the 4- and/or 5-hydroxyl group be present in the esterified form, which is the case, for instance, if peracetic acid, a lead tetracylate or a halogen-silver benzoate complex has been used for the hydroxylation, an agent eliminating acid (for example, an alkali or zinc dust in toluene or xylene) may be used in place of the agent eliminating water.

If the elimination of water or of acid be omitted, analogous oxidation of the pregnane-4,5,20-triols yields pregnane-5-ol-4,20-dione.

What we claim is:

1. Process for the manufacture of saturated and unsaturated pregnane polycarbonyl compounds and their substitution products, comprising treating a pregnane-20-one, containing in the rings A and B merely a member of the group of free, esterified and etherified tertiary hydroxyl groups with reducing agents, causing to react the products thus obtained with an agent capable of introducing a double bond by eliminating the said groups in the rings A and B together with the neighbouring hydrogen and finally with oxidizing agents.

2. Process for the manufacture of saturated and unsaturated pregnane polycarbonyl compounds and their substitution products, comprising treating a pregnane-20-one, containing in the rings A and B merely a member of the group of free, esterified and etherified tertiary hydroxyl groups with reducing agents, causing to react the products thus obtained with an agent capable of introducing a double bond by eliminating the said groups in the rings A and B together with the neighbouring hydrogen, hereupon with oxidizing agents and finally with hydrolyzing agents, and then with a member of the group consisting of oxidizing and dehydrogenating agents.

3. Process for the manufacture of saturated and unsaturated pregnane polycarbonyl compounds and their substitution products, comprising treating a pregnane-20-one, containing in the rings A and B merely a member of the group of free, esterified and etherified tertiary hydroxyl groups with reducing agents, then with a member of the group consisting of esterifying and etherifying agents, causing to react the products thus obtained with an agent capable of introducing a double bond by eliminating the said groups in the rings A and B together with the neighbouring hydrogen and finally with oxidizing agents.

4. Process for the manufacture of saturated and unsaturated pregnane polycarbonyl compounds and their substitution products, comprising treating a pregnane-20-one, containing in the rings A and B merely a member of the group of free, esterified and etherified tertiary hydroxyl groups with reducing agents, then with a member of the group consisting of esterifying and etherifying agents, causing to react the products thus obtained with an agent capable of introducing a double bond by eliminating the said groups in the rings A and B together with the neighbouring hydrogen, hereupon with oxidizing agents and finally with hydrolyzing agents.

5. Process for the manufacture of saturated and unsaturated pregnane polycarbonyl compounds and their substitution products, comprising treating a pregnane-20-one, containing in the rings A and B merely a member of the group of free, esterified and etherified tertiary hydroxyl groups with reducing agents, causing to react the products thus obtained with an agent capable of introducing a double bond by eliminating the said groups in the rings A and B together with the neighbouring hydrogen, then with a member of the group consisting of esterifying and etherifying agents and finally with oxidizing agents.

6. Process for the manufacture of saturated and unsaturated pregnane polycarbonyl compounds and their substitution products, comprising treating a pregnane-20-one, containing in the rings A and B merely a member of the group of free, esterified and etherified tertiary hydroxyl groups with reducing agents, causing to react the products thus obtained with an agent capable of introducing a double bond by eliminating the said groups in the rings A and B together with the neighbouring hydrogen, then with a member of the group consisting of esterifying and etherifying agents, hereupon with oxidizing agents and finally with hydrolyzing agents.

7. Process for the manufacture of saturated and unsaturated pregnane polycarbonyl compounds and their substitution products, comprising treating a pregnane-20-one, containing in the rings A and B merely a member of the group of free, esterified and etherified tertiary hydroxyl groups with reducing agents, causing to react the products thus obtained with an agent capable of introducing a double bond by eliminating the said groups in the rings A and B together with the neighbouring hydrogen, hereupon with oxidizing agents capable of adding two free hydroxyl groups to the double bond, and finally with a member of the group consisting of oxidizing and dehydrogenating agents capable of transforming hydroxyl into keto groups.

8. Process for the manufacture of saturated and unsaturated pregnane polycarbonyl compounds and their substitution products, comprising treating a pregnane-20-one, containing in the rings A and B merely a member of the group of free, esterified and etherified tertiary hydroxyl groups with reducing agents, causing to react the products thus obtained with an agent capable of introducing a double bond by eliminating the said groups in the rings A and B together with the neighbouring hydrogen, hereupon with oxidizing agents capable of adding two free hydroxyl groups to the double bond, and finally with a member of the group consisting of oxidizing and dehydrogenating agents capable of transforming hydroxyl into keto groups after the action of a water eliminating agent.

9. A pregnane derivative of the formula

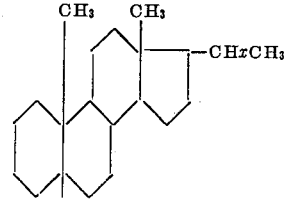

wherein $x$ is a member selected from the group consisting of a hydroxyl group and a group which upon hydrolysis is convertible into a hydroxyl group.

10. A pregnane derivative of the formula

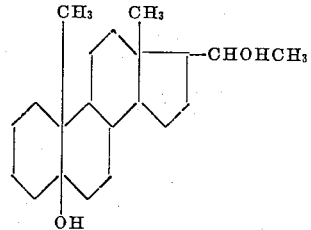

KARL MIESCHER.
ALBERT WETTSTEIN.